(12) United States Patent
Pandit et al.

(10) Patent No.: US 8,734,870 B2
(45) Date of Patent: May 27, 2014

(54) DENDRIMERS AND DENDRIMER APPLICATIONS

(75) Inventors: Abhay Pandit, Galway (IE); Gildas Rethore, Nantes (FR); Hemantkumar Naik, Yellapur (IN)

(73) Assignee: National University of Ireland, Galway, Galway (IE)

( * ) Notice: Subject to any disclaimer, the term of this patent is extended or adjusted under 35 U.S.C. 154(b) by 705 days.

(21) Appl. No.: 12/933,380

(22) PCT Filed: Mar. 19, 2009

(86) PCT No.: PCT/EP2009/053259
§ 371 (c)(1),
(2), (4) Date: May 11, 2011

(87) PCT Pub. No.: WO2009/115580
PCT Pub. Date: Sep. 24, 2009

(65) Prior Publication Data
US 2011/0217750 A1    Sep. 8, 2011

(30) Foreign Application Priority Data

Mar. 20, 2008  (IE) .................................. 2008/0212

(51) Int. Cl.
*A01N 63/02* (2006.01)
*A61K 35/00* (2006.01)

(52) U.S. Cl.
USPC .......................................................... 424/780

(58) Field of Classification Search
None
See application file for complete search history.

(56) References Cited

U.S. PATENT DOCUMENTS

| 6,255,444 B1 * | 7/2001 | Yuasa et al. | 528/308.6 |
| 2007/0041934 A1 * | 2/2007 | William et al. | 424/78.3 |

OTHER PUBLICATIONS

Duncan, "Drug-polymer conjugates: potential for improved chemotherapy," Anti-Cancer Drugs 3:175-210 (1992).
Gillies et al., "Biological Evaluation of Polyester Dendrimer: Poly(ethylene oxide) "Bow-Tie" Hybrids with Tunable Molecular Weight and Architecture," Molecular Pharmaceutics 2(2):129-138 (2005).
Hedden et al., "Structure and Dimensions of PAMAM/PEG Dendrimer-Star Polymers," Macromolecules 36(6):1829-1835 (2003).
Kojima et al., "Synthesis of Polyamidoamine Dendrimers Having Poly(ethylene glycol) Grafts and Their Ability to Encapsulate Anti-cancer Drugs," Bioconjugate Chemistry 11:910-917 (2000).
Kono et al., "Design of Dendritic Macromolecules Containing Folate or Methotrexate Residues," Bioconjugate Chemistry 10:115-1121 (1999).
Kunath et al., "The Structure of PEG-Modified Poly(Ethylene Imines) Influences Biodistribution and Pharmacokinetics of Their Complexes with $NF_{-\kappa}B$ Decoy in Mice," Pharmaceutical Research 19(6):810-817 (2002).
Luo et al., "Poly(ethylene glycol)-Conjugated PAMAM Dendrimer for Biocompatible, High-Efficiency DNA Delivery" Macromolecules 35:3456-3462 (2002).
Malik et al., "Dendrimers: Relationship between structure and biocompatibility in vitro, and preliminary studies on the biodistribution of $^{125}$I-labelled polyamidoamine dendrimers in vivo," Journal of Controlled Release 65:133-148 (2000).
Merdan et al., "Pegylated Polyethylenimine-Fab' Antibody Fragment Conjugates for Targeted Gene Delivery to Human Ovarian Carcinoma Cells," Bioconjugate Chemistry 14:989-996 (2003).
Merdan et al., "Prospects for cationic polymers in gene and oligonucleotide therapy against cancer," Advanced Drug Delivery Reviews 54:715-758 (2002).
Namazi et al., "Dendrimers of citric acid and poly (ethylene glycol) as the new drug-delivery agents," Biomaterials 26(10):1175-1183 (2005).
Petersen et al., "Polyethylenimine-*graft*-Poly(ethylene glycol) Copolymers: Influence of Copolymer Block Structure on DNA Complexation and Biological Activities as Gene Delivery System," Bioconjugate Chemistry 13:845-854 (2002).
Tomalia et al., "Genealogically Directed Synthesis: Starburst*/Cascade Dendrimers and Hyperbranched Structures," Topics in Current Chemistry 165:194-313 (1993).
Zinselmeyer et al., "The Lower-Generation Polypropylenimine Dendrimers Are Effective Gene-Transfer Agents," Pharmaceutical Research 19(7):960-967 (2002).

* cited by examiner

*Primary Examiner* — Cecilia J Tsang
*Assistant Examiner* — Sergio Coffa
(74) *Attorney, Agent, or Firm* — Foley & Lardner LLP; Antoinette F. Konski

(57) ABSTRACT

An activatable functionalised $N^{th}$ generation dendrimer having: a core comprising a first monomer having at least two carboxylic acid functional groups; and N successive generations, where N=0 to 10, wherein each generation comprises: a second monomer having at least two alcohol functional groups, wherein at least one alcohol group is bonded to a carboxylic acid group of the first monomer of the prior generation, and an additional first monomer attached to a second alcohol function group of said second monomer of that generation; and the final generation having attached thereto at said second alcohol functional group of said second monomer, a moiety having a dicarboxylic acid functional group, activatable by treatment with a carboxylic acid activating reagent such that reactivity of the carboxylic acid functional group is increased. The dendrimer, when activated, may be used in applications such as polymer crosslinking and/or nanoshell production.

11 Claims, 2 Drawing Sheets

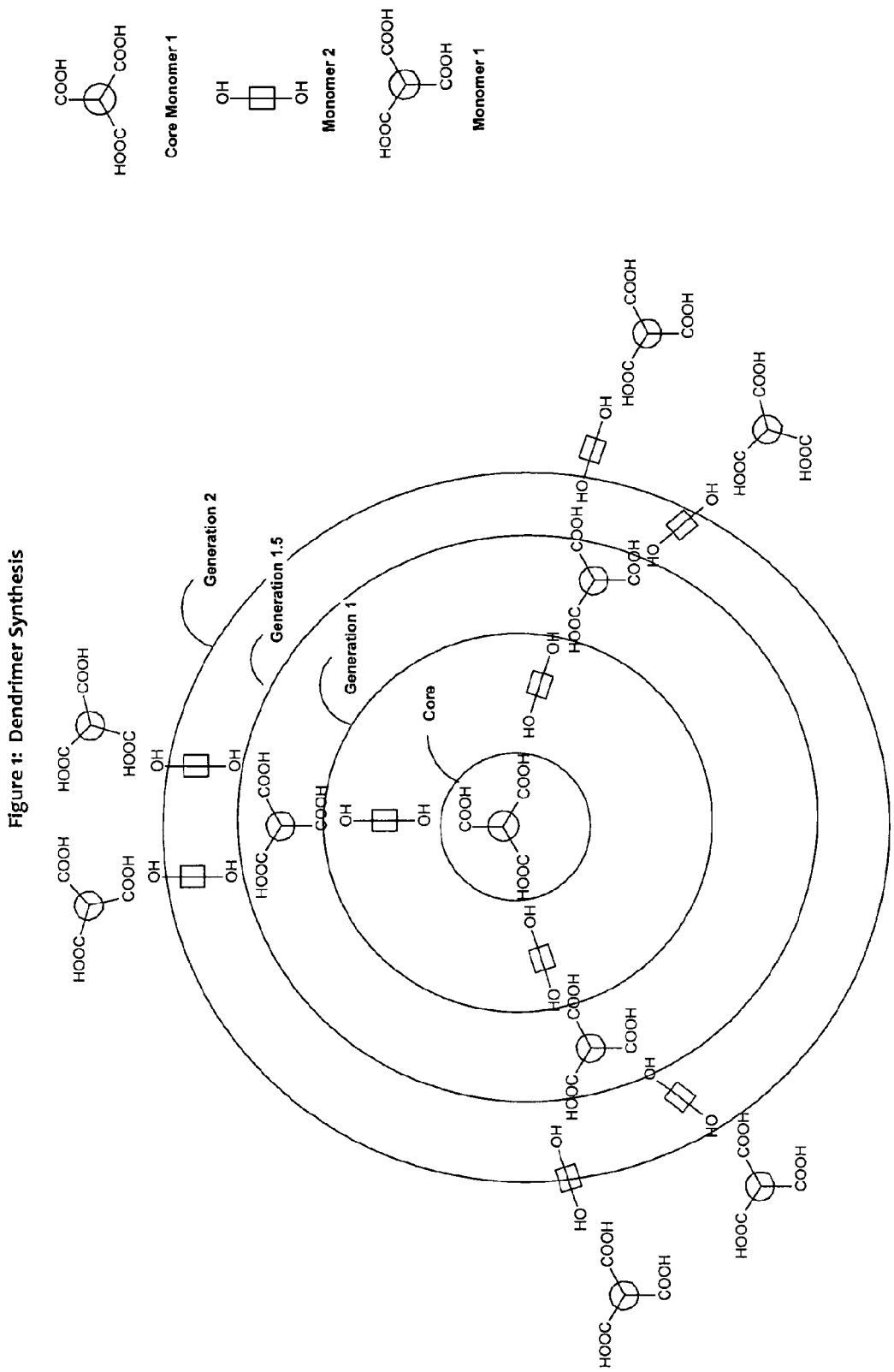

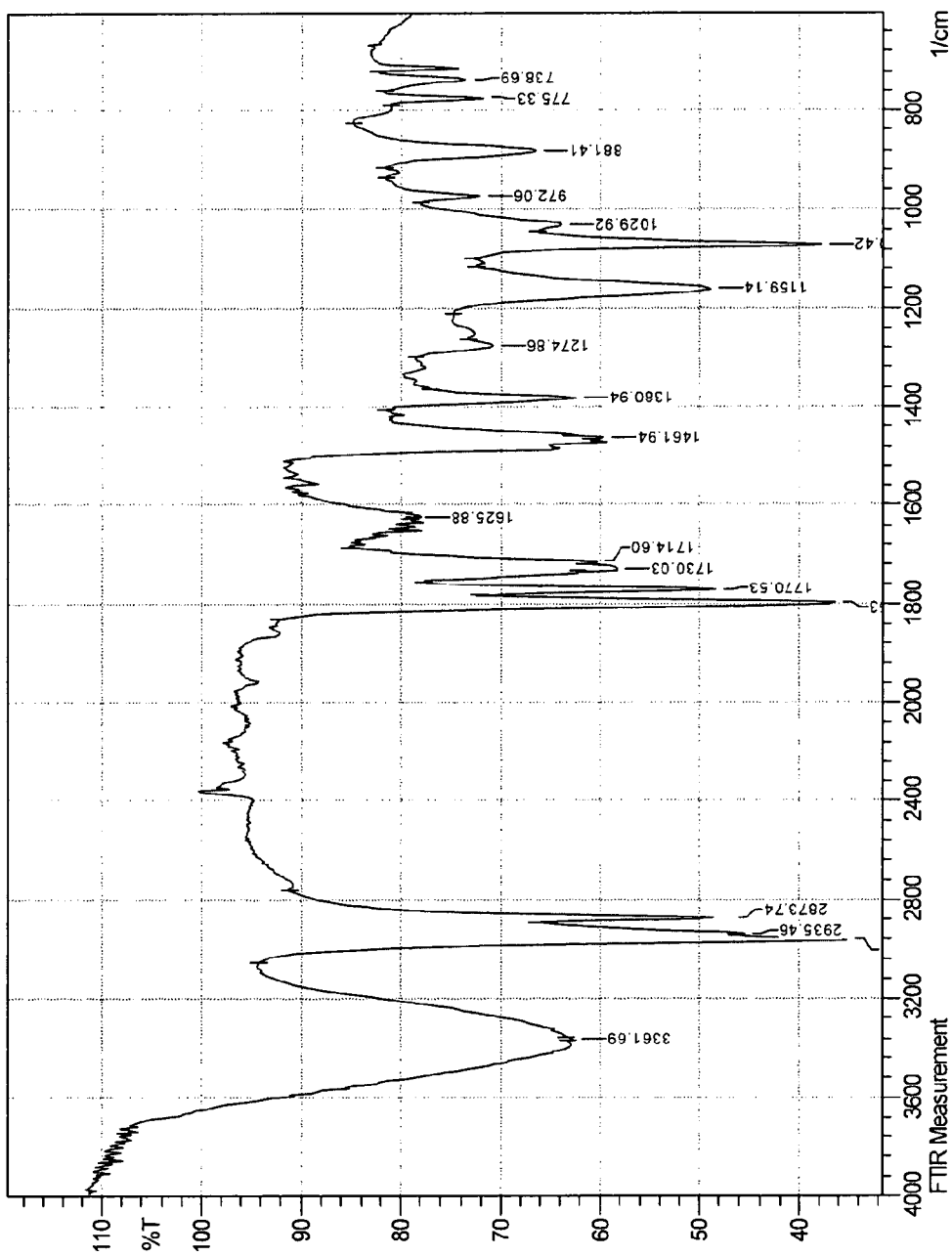
Figure 2: FTIR spectra of G3 dendrimer (OH terminated dendrimer)

DENDRIMERS AND DENDRIMER APPLICATIONS

CROSS REFERENCE TO RELATED APPLICATIONS

The present application is a national stage application under 35 U.S.C. §371 of International Application No. PCT/EP2009/053259, filed Mar. 19, 2009, which in turn claims priority to Irish Application No. 2008/0212, filed Mar. 20, 2008, the contents of each of which is hereby incorporated by reference into the present disclosure.

FIELD OF THE INVENTION

The present invention relates to highly branched functionalised polymers, more particularly functionalised dendrimers whose chemical properties can be tailored according to the functional groups located on the dendrimer surface. The invention also relates to applications of such dendrimers, in particular their role as natural polymer cross-linkers.

BACKGROUND TO THE INVENTION

Dendrimers are three-dimensional polymers that are grown by the successive addition of shells or layers of branched molecules to a central core. Dendrimers have several advantages over linear polymers, since they have controllable structure, a single molecular weight rather than a distribution of molecular weights, and a large number of controllable surface functionalities, and an inclination to adopt a globular conformation once a certain size is reached. They are prepared by reacting highly branched monomers together to produce monodisperse, tree-like and/or generational structure polymeric structures. Individual dendrimers consist of a central core molecule, with a dendritic wedge attached to each functional site. The dendrimeric surface layer can have a variety of functional groups disposed thereon, according to the assembly monomers used during the preparation. Generally, the dendrimer functional groups dictate the properties of the individual dendrimer types.

As a result of their design, dendrimer cores are spacious, and by modifying the chemical properties of the core, shells, and especially the surface layer, their physical properties can be finely tuned. Tunable properties include solubility, toxicity, immunogenicity and bioattachment capability. The core molecule is referred to as Generation 0. Each successive repeat unit along all branches, forms the next generation, Generation 1, Generation 2 and so on, until the terminating generation results. Half generations are possible, since generally, two condensation reactions steps are required to produce each full generation. Half generations are attained where generation formation is terminated at the first condensation reaction. Preparation of dendrimers requires a high level of synthetic control, which is achieved through series of stepwise reactions, which comprise building the dendrimer up one layer or generation at a time. Dendrimer synthesis can be of the convergent or divergent type. During divergent dendrimer synthesis, the molecule is assembled from the core to the periphery in a stepwise process involving attaching one generation to the previous and then changing functional groups for the next stage of reaction. Functional group transformation is necessary to prevent uncontrolled polymerisation. Such polymerisation would lead to a highly branched molecule that is not monodisperse and is otherwise known as a hyperbranched polymer. Hyperbranched polymers are undesirable, since they are thought to be potentially immunogenic. Due to steric effects, continuing to react dendrimer repeat units leads to a sphere shaped or globular molecule, until steric overcrowding prevents complete reaction at a specific generation and destroys the molecule's monodispersity. For this reason, typically dendrimers of G1-G10 generation are the most useful. However, the number of possible generations can be increased by reducing the spacing units in the branching polymer. For example, if ethyleneglycol is used during synthesis, generations greater than G10 can be prepared.

Dendrimers have two major chemical environments: namely specific surface chemistries, due to the functional groups on the termination generation (which is the surface of the dendritic sphere) and due to the sphere's interior (which is largely shielded from exterior environments due to the spherical shape of the dendrimer structure). The existence of two distinct chemical environments in such a molecule implies many possibilities for dendrimer applications. Dendrimers have found actual and potential use as molecular weight and size standards, gene transfection agents, as hosts for the transport of biologically important guests, in drug or biomolecule delivery and/or encapsulation systems, as micelles and as anti-cancer agents, to name but a few. Dendrimers' globular shape and molecular topology, however, make them highly useful to biological systems as well. In addition, dendrimers possess a strictly controlled number of functional groups on their periphery that can be used for the attachment.

Desirable properties for dendrimer use in biological systems include water solubility, lack of both toxicity and immunogenicity, low polydispersity, presence of internal voids and the presence of multiple, highly accessible functionalised arms for drug group, solubilising groups, targeting groups, or other moieties' attachment; all of which allow tuning of the biological properties of the system. Despite the large number of polymers available, relatively few possess all of these features. Many known dendrimers lack biodegradability, especially at higher molecular weights. This limits the size of dendrimer which can be used in biological applications.

Polyamidoamine (PAMAM), polypropyleneimine (PPI), polyarylether (PAE) and polyethyleneimine (PEI) are examples of dendrimers that have been investigated for biopharmaceutical applications [1-5]. Polyamidoamine (PAMAM) dendrimers are based on an ethylenediamine core and an amidoamine repeat branching structure. They can be synthesized in a variety of well-defined molecular weights. Their size and surface functionality (primary amine) is defined by the number of controlled repetitive additions of monomeric units, giving rise to different half or full generations. They are water-soluble and they have been reported to be the only class of dendrimer that are mono-dispersed. Furthermore, they show high charge densities that are restricted to the surface of the molecules. The synthesis of PAMAM can be tailored so as to influence the groups at the surface. Full PAMAM generations such as G1, G2, have amine functionalised surfaces to produce cationic dendrimers; while half Generations such as G1.5, G2.5, etc., have carboxylic acid groups at the surface and provide anionic dendrimers [6]. Interestingly, dendrimers adopt a tighter "native" shape or an extended "denatured" state, depending on solution pH.

Cationic PAMAM dendrimers, exhibit non-specific binding or interactions with cellular blood components and plasma proteins, such as albumin, fibronectin, immunoglobulins, complement factors and/or fibrinogen, have very short half-lives. Unfortunately, they have been shown to be toxic due to electrostatic interactions with the negatively charged components of cellular membranes [1]. They are known to cause destabilization of cell membranes and can result in cell lysis. In fact, in a recent study, PAMAM dendrimers have been shown not to be suitable carriers for agents such as biodegradable macromolecular MRI contrast agents, due to their high toxicity. Furthermore, regardless of the internal repeat unit structure, cationic dendrimers have been found to be haemolytic and cytotoxic, which is dependent on the generation and the number of surface ionic groups [2,7]. Efforts have been made to modify PAMAM dendrimer using polyethylene glycol to reduce these non-specific interactions and cytotoxicities. Hedden et al, grafted PEG chains of low polydispersity onto the terminal groups of PAMAM dendrimers [14]. Recently, Gillies et al, have reported a biocompatible polyester "bow-tie" dendrimer based on the monomer 2,2-bis (hydroxymethyl) propionic acid [12]. The new polyester dendrimer-PEG bow-tie hybrids were evaluated for their potential as drug delivery vehicles. In vitro experiments indicated that the polymers were nontoxic to MDA-MB-231 cells, and that they were degraded to lower MWs at the normal physiological pH of 7.4, and at the mildly acidic pH of 5.0. Other polyester based dendrimers are known, for example, U.S. Pat. No. 5,834,118 describes hyperbranched polyesters of a polyol with 3 to 10 reactive hydroxyl groups and an aromatic polycarboxylic anhydride with 2 to 4 carboxyl groups; each hydroxyl group of the polyol forms an ester linkage with one anhydride of the polycarboxylic anhydride, and further glycidyl (meth)acrylate or allyl glycidyl ether forming ester linkages with the remaining carboxylic group of the anhydride and free hydroxyl groups.

In 2003, International Publication No. WO 03/064502 described polyester dendrimers of polyols, wherein the dendrimer has 2 to 64 reactive hydroxyl groups. The polyester dendrimers are produced using alternating sequences of haloacetyl halide and carboxylate alkali metal salts. The dendrimer products are used as: cross linkers for polymers and gels, in glues and coatings, as matrix material for composites; as well as having useful roles in analytic and catalytic chemistry.

In 2004, Namazi et al. described biocompatible G1-G3 citric acid-polyethylene glycol-citric acid (CPEGC) triblock dendrimers, which were applied as solubilising controlled release drug-delivery systems for hydrophobic drugs, such as 5-amino salicylic acid (5-ASA), pyridine, mefenamic acid, and diclofenac [13]. This dendrimer has a polyethylene glycol core and N=1-3 generations comprising citric acid branch extenders.

The human body is not always capable of repairing or replacing damaged tissue. As a result, tissue structures or scaffolds have been developed in order to facilitate the regeneration of damaged or diseased tissue. Tissue scaffolds function to provide the support upon which cells can attach, grow and differentiate at the site of injury or damage.

Tissue engineering attempts to create three-dimensional tissue structures on which cells and other biomolecules may be incorporated. These structures or scaffolds guide the organization, growth, and differentiation of cells, in the process of forming functional tissue by providing physico-chemical cues. To successfully incorporate a scaffold within the host body depends on efficient communication between cells, tissues, and the host system as a whole. The scaffolds and cells to be incorporated must, therefore, interact with adhesion and growth factor receptors or bind such factors; and the scaffold must eventually degrade.

Many disease conditions or injuries of the body require the repair or replacement of damaged tissues, but the body itself may not be able to replace or repair the tissue satisfactorily, or do so within an appropriate time scale. Thus many methods of disease or injury treatment involve methods of augmenting the body's natural repair mechanisms and often rely on the use of implantable biological scaffolds or prostheses. Ideally, an implantable prosthesis should be chemically inert, noncarcinogenic, capable of resisting mechanical stress, sterilisable, and resistant to the actions of tissue fluids, as well as being non-inflammatory and hypoallergenic. A number of biological and synthetic scaffolds are known.

Scaffold substrates support growth and function of cells and, therefore, are essential to successful tissue engineering. Various tissues and tissue components of animal origin are currently used as scaffolds. Such scaffolds are desirably derived from natural polymer materials. Biological scaffolds when based on natural polymers, typically comprise proteins such as elastin, laminin, gelatin, fibrin, fibrinogen and collagen. Such biological scaffolds have a number of advantages over synthetic scaffolds: communication with existing body cells is instantaneous, they undergo a natural process of degradation, and existing biological signals attenuate incorporated signals (biological cues present in the scaffold provide signalling cues to the host cells) such as the growth factors and cytokines (which are inherently present in these scaffolds). Biological scaffolds must be noncarcinogenic, non-immunogenic, and biodegradable. Biological scaffolds must be cross-linked for strength and rigidity before implantation and use. However, such crosslinking modifications are not as easily made to biological scaffolds as they are to synthetic scaffolds. Minimally altered scaffolds will retain most of the natural molecules required to establish the expected therapeutic properties of the tissue-engineered organ or tissue. Upon implantation, these retained natural molecules are also further amenable to natural degradation.

Intact decellularised xenogenic/allogenic extracellular matrices (ECM), which are the parts of animal tissue that usually provide structural support to cells, are widely used in the manufacture of tissue-engineering scaffolds. The extracellular matrix (ECM) is essential for processes like growth, wound healing, and fibrosis. ECM comprises a matrix of natural polymers such as elastin, fibrin, laminin, fibronectin and collagen.

Advantages of utilising such matrices or individual natural polymers in biological scaffold applications arise from their low toxicity to tissue and their well-documented structural, physical, chemical, and immunological properties. In their purified state however, these polymers are weakly cross-linked and therefore do not possess the adequate mechanical properties needed for tissue engineering applications. The formation of covalent intermolecular cross-links between polymer molecules offers an effective method of improving the mechanical integrity and stability of natural polymers.

Polymer substrates have been widely used in biomaterials applications, for example: as wound dressings, matrices for the controlled release of active agents or as tissue engineering scaffolds, and more recently, in nanoshell applications such as targeted delivery of genes, antibodies, peptides and pharmaceuticals. Various procedures have been explored to cross-link natural polymers physically. Such methods include dehydrothermal treatment and ultraviolet irradiation to induce crosslinking between complementary groups within the polymer. Unfortunately, physical cross-linking, while avoiding the introduction of potentially cytotoxic chemical residues, leads to alteration of the chemical structure of the protein-based scaffolds (e.g. denaturation).

Use of polyethylene glycol (PEG) is of interest in production of biocompatible matrices. It is an interesting polyether for a number of reasons; PEG is a non-toxic, non-immunogenic, biodegradable molecule, which is water-soluble but yet will dissolve in organic solvents such as benzene and dichloromethane. PEG molecules can be linked to hydrophilic and/or hydrophobic drugs, allowing roles in drug delivery. However, to date, most cross-linking mechanisms using PEG are poorly controlled and not very efficient. Viers et al., attempted to overcome such deficiencies by endlinking telechelic vinyl sulfone (VS) end functionalised PEG with the terminal amines found on commercially available dendrimers such as PAMAM dendrimers. The VS terminated PEG endlinked to the dendrimer crosslinking molecules were successfully used to swell hydrogels.

A wide variety of other studies have reported the chemical use of the fixing agent glutaraldehyde (GA) as a means of cross-linking natural polymers. However, GA fixation is reportedly plagued by calcification and cytotoxicity problems. As a result, a significant amount of research has been directed towards finding alternative effective cross-linking mechanisms. Alternative chemical cross-linkers investigated include use of reagents such as diisocyanates, acyl azide and 1-ethyl-3-(3-dimethyl aminopropyl) carbodiimide (EDC). Most cross linking agents are "bridge-forming" agents, meaning that the polymer molecules are linked by a cross-linking molecule and the cross-links act as bridges between natural polymer molecules. Variation of the length of crosslinking side chains allows for control of spacing within the cross-linked polymer. EDC is also regularly used in organic chemistry to couple carboxylic acid groups to alcohol groups using, for example, (4-dimethylaminopyridine) DMAP as a catalyst. In biological applications, it is generally used as a carboxyl group activating agent for the coupling of primary amines to yield amide bonds. Additionally, it can also be used to activate phosphate groups towards derivatization. Thus, EDC has found roles in: peptide synthesis, protein crosslinking to nucleic acids, and preparation of immunoconjugates. EDC is often used in combination with N-hydroxysuccinimide (NHS) or sulfo-NHS to increase coupling efficiency or create a stable amine-reactive product.

During polymer EDC cross-linking, "zero-length" cross-links (wherein the natural polymer protein chains are directly bonded together) are formed, allowing the polymers to be directly linked to one another. An advantage of using the EDC method over other chemical cross-linking methods arises, because EDC leaves no cytotoxic residuals, and urea, the non-toxic by-product of this reaction, is easily washed off the treated natural polymer. A disadvantage, however, is that EDC crosslinking, using diamine from the EDC reagent as a cross linking bridge, reportedly offers little improvement in the biological stability of the resultant material.

Of particular interest is the recent use of dendrimers in natural polymer crossing linking. Their potential use as a candidate for crosslinking stems from the ability of the surface functional groups to react with natural polymer groups, such as amine, amide, hydroxyl or thio functionalities, to form covalent bonds and to act as a bridging linker that provides for good spacing within the natural polymer fibres.

Recently several publications have disclosed the use of branched polymer molecules, such as dendrimers, as a means of cross-linking natural polymers. Sheardown et al., describe a method of cross-linking collagen polymers with an amine functionalised polyamidoamine (PAMAM) dendrimer using carbodiimide (EDC) chemistry. This dendrimer has an amine surface functional group available for cross-linking with the carboxyl group of amino acids of natural polymers. However, for cross-linking to take place using the PAMAM/EDC system, the natural polymer functional groups have to be first activated using an in situ carbodiimide reaction. This results in the activation of the carboxylic (COOH) groups of the collagen polymer towards the amine ($NH_2$) groups of the PAMAM dendrimer. However, this system suffers from severe shortcomings; the collagen carboxylic group activation mechanism can lead to internal cross-linking between the internal COOH groups and $NH_2$ groups of collagen natural polymer to result in the production of zero-length cross links. This is undesirable since internal collagen crossing linking of this type has the effect of reducing the space available for cell penetration into the polymer matrix or scaffold, and also, may restrict the passage for oxygen and nutrients thereto.

Despite the drawback of zero-length cross links, the use of functionalised dendrimers as natural polymer cross-linkers is preferable over use of other cross linking agents; advantageously, they can be utilised to provide a variety of chemical functionalities to natural polymeric systems. The availability of functional groups on the surface of the dendrimer permits the binding of, for example, exogenous bioactive molecules such as drugs, markers or endogenous molecules such as hormones or antibodies. Thus, the provision of biological functionalities within the scaffold, that act to guide tissue regeneration, is highly desirable. Currently available technologies using carbodiimides (such as those described above) are further limited in that they will not permit the fuctionalisation of the polymer matrix without altering the biological properties of the polymer itself. Furthermore, it will be appreciated that the stability of a biological scaffold or polymer matrix can be tailored by controlling the extent of cross-linking. This is easily achieved through adjusting the natural polymer, dendrimer cross-linking ratios. Therefore the amount of dendrimer used in the cross-linking reaction is critical in controlling scaffold degradation; a lesser degree of cross-linking will mean the polymer is easier to degrade.

There is still a need to provide new dendrimer systems that are highly biocompatible, are biodegradable, have well-defined MWs, and have functional groups. More desirably still, there is a need to provide an improved dendrimer having all of the aforementioned characteristics, but in addition, one that is more reactive than existing functionalised dendrimers; ideally the improvement will negate the requirement for toxic chemicals, such as EDC, for use in dendrimer applications.

SUMMARY OF THE INVENTION

According to the present invention, as set out in the appended claims, there is provided an activatable functionalised $N^{th}$ generation dendrimer having:

a core comprising a first monomer having at least two carboxylic acid functional groups; and N successive generations, where N=0 to 10, wherein each generation comprises:
- a second monomer having at least two alcohol functional groups, wherein at least one alcohol group is bonded to a carboxylic acid group of the first monomer of the prior generation, and
- an additional first monomer attached to a second alcohol function group of said second monomer of that generation; and the final generation having attached thereto, at said second alcohol functional group of said second monomer, a moiety having a dicarboxylic acid functional group, activatable by treatment with a carboxylic acid activating reagent such that reactivity of the carboxylic acid functional group is increased.

Thus, there is provided a new range of alternative, biodegradable, activated dendrimer polymers, being more reactive, having better defined MWs and architectures, which enable enhanced control over drug loading, cross-linking etc., which will broaden the scope of applicability of dendritic polymers in these and other related therapeutic applications. Thus the invention as described herein, provides a biologically friendly pre-activated functionalised dendrimer for use in existing and new dendrimer based technologies.

The invention advantageously provides a pre-activated functionalised dendrimer and a method for cross-linking natural polymers using said dendrimer, which does not require pre-activation of the natural polymer functional groups, through use of toxic reagents such as EDC.

In a preferred embodiment, the moiety having a dicarboxylate functional group is derived from an acid anhydride. Suitably, the acid anhydride is succinic acid anhydride, maleic acid anhydride, glutaric acid anhydride, adipic acid anhydride, pimelic acid anhydride, suberic acid anhydride, azelaic acid anhydride or sebacic acid anhydride. In a preferred embodiment, the dicarboxylate functional group is derived from an acid anhydride which is succinic acid anhydride.

Preferably, the carboxylic acid activating reagent is selected from the group comprising pentafluorophenol (PFP), N-hydroxy succinimide (NHS), benzotriazol-1-yl-oxy-tris (dimethylamino)phosphoniumhexafluorophosphate (BOP), benzotriazol-1-yl-N-oxy-tris(pyrrolidino)-phosphonium hexafluorophosphate (PyBOP), bromo-tris(pyrrolidino)-phosphonium hexafluorophosphate (PyBroP), N-[(dimethylamino)-1H-1,2,3-triazolo-[4,5-b]pyridin-1-yl-methylene]-N-methylmethanaminium hexafluorophosphate N-oxide (HATU), N-[(1H-benzotriazol-1-yl)(dimethylamino)methylene]-N-methylmethanaminium hexafluorophosphate N-oxide (HBTU) and 2-(1Hbenzotriazole-1-yl)-1,1,3,3-tetramethyluronium tetrafluoroborate (TBTU). Pentafluorophenol (PFP) is a preferred carboxylic acid activating reagent of choice, since it provides a particularly stable and active intermediate compound. In a particularly preferred embodiment, the most preferred carboxylic acid activator is NHS. This is the particularly preferred carboxylic acid activating reagent for biomedical applications utilising the activated dendrimer.

In one embodiment, the first monomer may have at least two carboxylic acid functional groups. Suitably, such a monomer may be a 1,3,5-tricarboxylic acid such as citric acid and aconitic acid. More suitably still, the 1,3,5-tricarboxylic acid may be aconitic acid. Aconitic acid is the preferred compound for use as the first monomer (or 1,3,5-tricarboxylic acid, in this case).

In another embodiment, the second monomer having at least two alcohol functional groups can be a polyether such as a polyglycol. It is preferred to use a polyethylene glycol, since advantageously it is relatively non-toxic and biodegradable. Suitably, the polyether may be selected from the group comprising ethylene glycol, diethylene glycol, triethylene glycol or tetraethylene glycol or longer poly glycol chains. The polyglycol will depend on the size of dendrimer required for the particular application; it will be appreciated that compact dendrimers with lots of surface functionalities can be attained using high generation dendrimers comprising short polyglycol chains. Conversely, more spacious dendrimers can be provided by using longer polyglycol chains during dendrimer synthesis. In a particularly preferred embodiment, diethylene glycol is the preferred second monomer having two alcohol functional groups.

In one embodiment, the dendrimer of the present invention may be constructed from an aconitic acid as first monomer and from PEG as the second monomer. The dendrimer thus formed may have a structural formula G1.

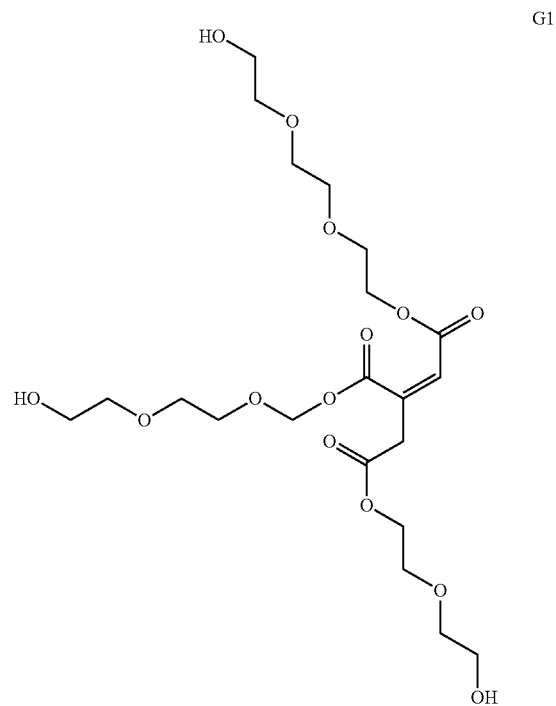 [SMILES: O=C(/C=C(/CC(=O)OCCOCCO)C(=O)OCOCCOCCO)OCCOCCOCCO]

In another embodiment, the dendrimer may have a structure formula G2.

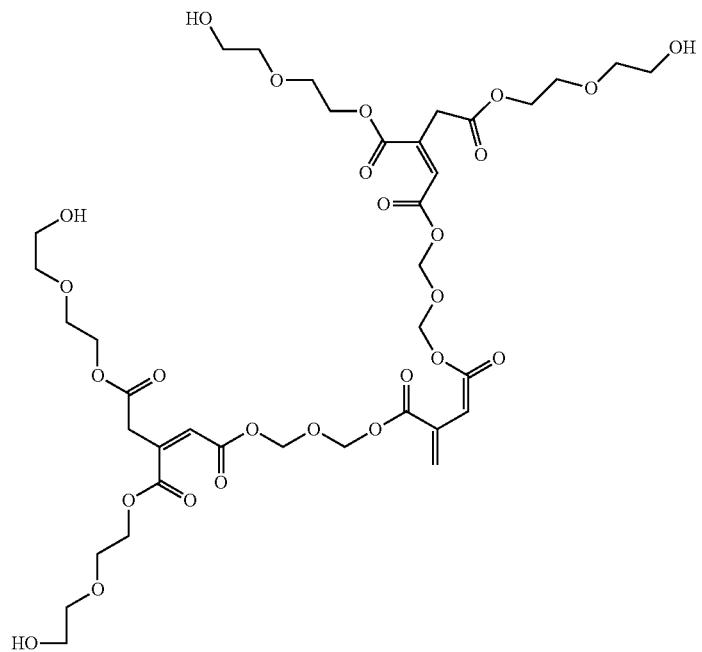
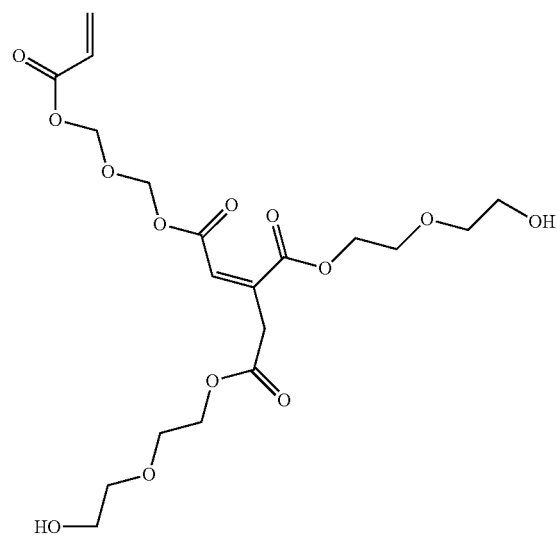
G2

In yet another embodiment still, the dendrimer may have a structure formula G3.

polymer scaffolds. Cross-linked natural polymers comprising said dendrimers may be used in tissue engineering as biological scaffolds. In a preferred embodiment of the invention, the cross-linking agent comprises the dendrimer described herein comprising aconitic acid first monomer core and PEG based second monomers (G1, G2 or G2, etc., as described herein).

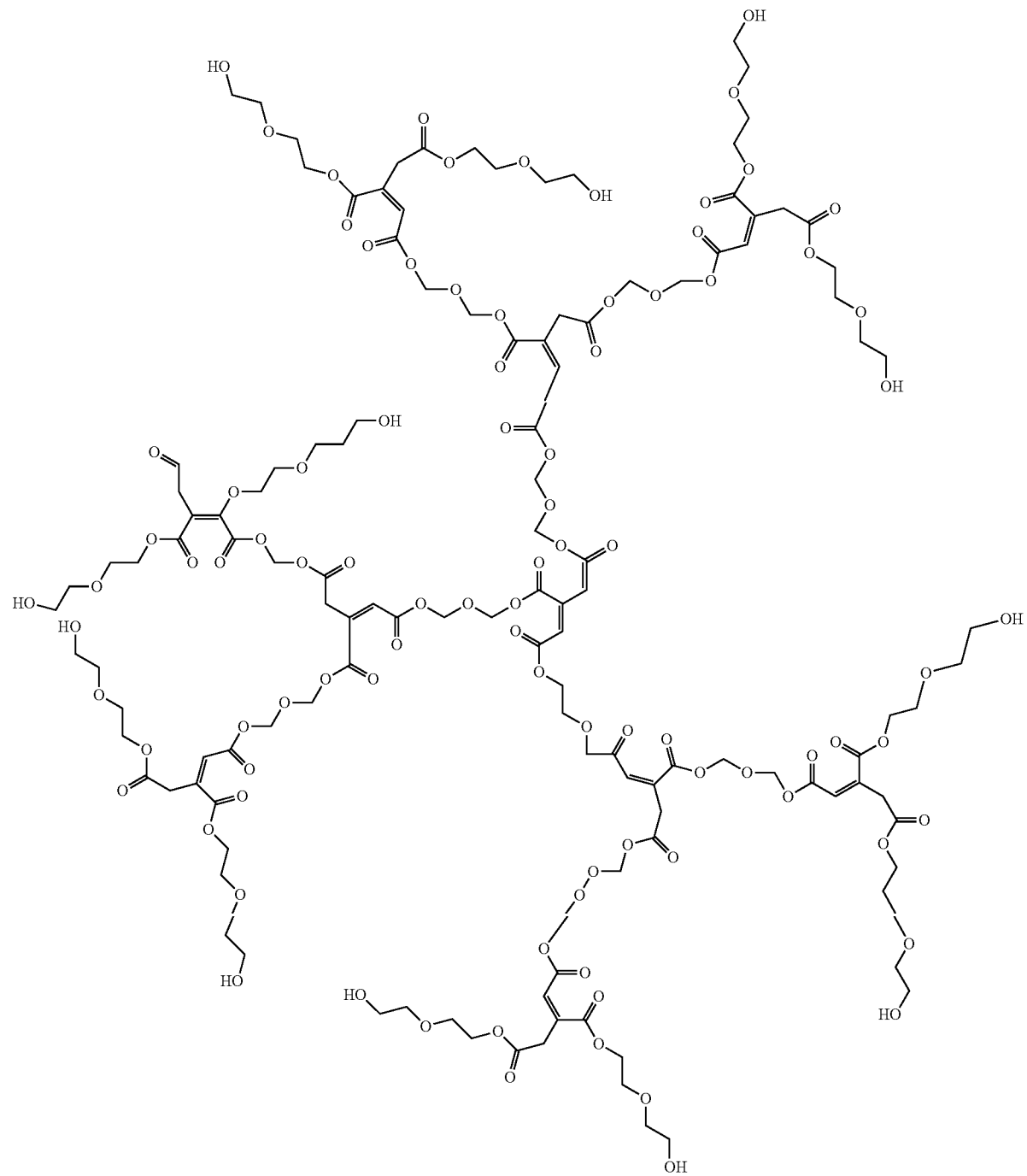

G3

In a related aspect the invention provides a method of cross-linking a natural polymer with a pre-activated dendrimer comprising treating a natural polymer with a solution of pre-activated functionalised COOH dendrimer to produce a cross-linked polymer scaffold.

Thus, the invention advantageously provides a natural polymer cross-linking agent which comprises an activated dendrimer which can be used in the manufacture of natural Advantageously, there is provided, a new method of controlling cross-linking in natural polymers using the pre-activated functionalised dendrimer as described herein to, for example, produce scaffolds with programmed spaces between cross-links.

Such an improved tissue scaffold, comprising a natural polymer having the pre-activated functionalised dendrimer as crosslinker, allows the tissue scaffold to be functionally modified by the incorporation of bioactive molecules such as hormones, drugs, growth factors, peptides, and the like, for a variety of therapeutic applications such as wound dressings, matrices for the controlled release of active agents, and as tissue engineering scaffolds and gene vectors (viral and/or non-viral). The tissue scaffold of the present invention is produced from a cross-linked natural polymer having improved biocompatibility and biodegradability, but without contamination with harsh or toxic chemical reagents or cross-linking reaction side products.

In a related aspect involving such a method, the polymer may be selected from the group consisting of collagen, chitosan, chitin, hyaluronan, elastin, or any other polymer with an amino acid sequence having groups which are reactive towards activated carboxylic acid groups. In a preferred embodiment, the polymer to be cross-linked is preferably collagen.

In a further related aspect, the cross-linked scaffold may then be freeze-dried and washed with 50:50 triethylamine:water or dilute ammonium hydroxide.

The scaffold crossing linking method may further comprise the binding of one or more biomolecules to the available pre-activated COOH functional groups of the dendrimer. Suitably, the biomolecules may be one or more of: drugs, growth factors, peptides, cells and vectors (viral and/or non-viral).

Thus, there is provided an advantageous dendrimer with increased intrinsic activity, that can function as both a linker to the scaffold and a carrier of bioactive molecules, particularly molecules such as hormones, growth factors, peptides, vectors, drugs or markers. Such functional can be achieved by the introduction of functional groups such as carboxylate, hydroxyl, amine etc., into the polymer and to allow binding of bioactive molecules such as hormones, drugs, growth factors, peptides and the like to the polymer. In a preferred embodiment the preferred functional group is carboxylate.

In yet another aspect the pre-activated functionalised dendrimer of the present invention can be used in the production of biodegradable mono-disperse nanoshells for use in nanoshell applications, for example as carriers of biomolecules, therapeutic agents/and or imaging agents. Such nanoshells comprise at least one biodegradable polymer characterised in that the at least one polymer is cross-linked with the pre-activated functionalised dendrimer of the present application. In one embodiment, the nanoshell may be constructed from an aconitic acid as first monomer and from PEG as the second monomer as described herein.

BRIEF DESCRIPTION OF THE DRAWINGS

The invention will be more clearly understood from the following description of an embodiment thereof, given by way of example only, with reference to the accompanying drawings, in which:—

FIG. 1 shows schematic diagram of dendrimer synthesis; and

FIG. 2 shows the infrared spectrum of a typical G3 Dendrimer of the present invention.

DETAILED DESCRIPTION OF THE INVENTION

Referring now to the drawings and specifically FIGS. 1 to 9 inclusive and initially FIG. 1. FIG. 1 shows a schematic drawing illustrating divergent dendrimer synthesis using a tricarboxylic acid core initiating monomer that is reacted with a polyol monomer to produce the first dendrimer generation G1. The build up of successive generations and half generations can be observed in the drawing. Use of tricarboxylic acid and alcohol functionalised monomers leads to successive generations where the monomers are linked by ester bonds.

Now referring to FIG. 2, FIG. 2 shows the infrared spectra of a G3 hydroxyl terminated dendrimer with —OH stretching bands.

The present invention provides a method of synthesizing novel biodegradable, biocompatible, non-toxic, pre-activated functionalised dendrimers which can be used to crosslink natural polymers without the requirement for pretreatment of the polymer with reagents such as EDC or other carbodiimide and/or to incorporate functionality and controlled levels of stability to such polymers through use of functionalised dendrimer cross linkers which are capable of binding other molecules or delivering drugs, genes or other biomolecules for example.

The pre-activated dendrimer can be made using diol based monomers, for example PEG based (polyethylene glycol, propylene glycol, or polyethylene oxide) wherein the PEG backbone can comprise from one to ten atoms. Dendrimers can also be based on polyols which can be branched or unbranched and have multiple hydroxyl groups, such as pentaerythritol or glycerol. If polyols are used, a higher complexity of arm branching can be incorporated into the dendrimer body. Preferably, the dendrimer is made from longer chains of PEG (3-10 atoms), which advantageously provide areas of space for cells, nutrients and oxygen (for growth of the cells) to penetrate into the polymer scaffold.

The pre-activated functionalised dendrimer can have any number of branched arms extending from the dendrimeric core, depending on the starting initiator core and the number of generating steps employed. For example, use of a tricarboxylic acid such as aconitic acid in a first generation step will provide a first generation carboxylic acid functionalised dendrimer (G1) having three branches, a second generation step will provide a second generation dendrimer (G2) with six branches and a third generation dendrimer (G3) with twelve branches, so on and so forth. For the present invention, it is envisaged that dendrimers up to G10 level will be suitable for use in polymer-based scaffolds and other biological dendrimer applications.

In one embodiment, the synthesised pre-activated dendrimer is functionalised to allow crosslinking to occur. The functionalised pre-activated dendrimer may have, for example, a carboxylic acid functionality or an amine functionality. Carboxylic acid functionality is preferred; the activated carboxylic acid functional group lends anion properties to the dendrimer which means the dendrimer is less toxic than cationic dendrimers. Furthermore, the carboxylic acid functional group can be used to bind to amino acids in the natural polymer or individual exo- or endogenous peptides, hormones, drugs or antibodies for example.

Activation occurs by using activating agents such as pentafluorophenol (PFP), N-hydroxy succinimide (NHS), benzotriazol-1-yl-oxy-tris(dimethylamino)phosphoniuhmexafluorophosphate (BOP); benzotriazol-1-yl-N-oxy-tris(pyrrolidino)-phosphonium hexafluorophosphate (PyBOP); bromo-tris(pyrrolidino)-phosphonium hexafluorophosphate (PyBroP); N-[(dimethylamino)-1H-1,2,3-triazolo-[4,5-b]pyridin-1-yl-methylene]-N-methylmethanaminium hexafluorophosphate N-oxide (HATU); N-[(1H-benzotriazol-1-yl)(dimethylamino)methylene]-N-methylmethanaminium hexafluorophosphate N-oxide (HBTU); 2-(1Hbenzotriazole-1-yl)-1,1,3,3-tetramethyluronium tetrafluoroborate (TBTU). NHS and PFP are the preferred activators. However, NHS is the activator of choice. In the case of carboxylic acid functionalised surfaces, use of such reagents result in the formation of a highly reactive Lewis acid species which is extremely reactive towards amine groups and thus advantageously does not require use of agents such as EDC to engage in cross linking.

Example of a Third Generation Dendrimer—Method 1

A "three Generation" dendritic system (G3) is prepared by a series of subsequent assembly steps. In this example, Generation 1 (G1) has three carboxylic terminal arms. Generation 2 (G2) has six arms and Generation 3 (G3) has twelve arms.

Preparation of Mono-Protected Dendrimer Building Block

The mono-protected diol, for example, can be prepared from any diol, such as for example, diethylene glycol, triethylene glycol, tetraethylene glycol. For this example it is preferable to use ethylene glycol. One of the diol alcohol groups can be protected using any labile alcohol protecting groups reagents such as p-toluene sulfonyl chloride (pTSCl), trimethylsilyl chloride (TMS), tert-butyldiphenylsilyl (TBDPS), tert-butyldimethylsilyl chloride (TBS/TBDMS) and triisopropylsilyl chloride (TIPS), in the presence of silver oxide or silica gel as catalyst for the reaction, in the presence of an alkali halide such as potassium iodide, in an inert non-polar solvent such as chloroform, dichloromethane, dichloroethane, tetrahydrofuran or dimethylformamide (DMF) (Wang et al). Dichloromethane is preferably used. This results in formation of the mono-protected diol dendrimer building block. A typical reaction scheme is shown here:

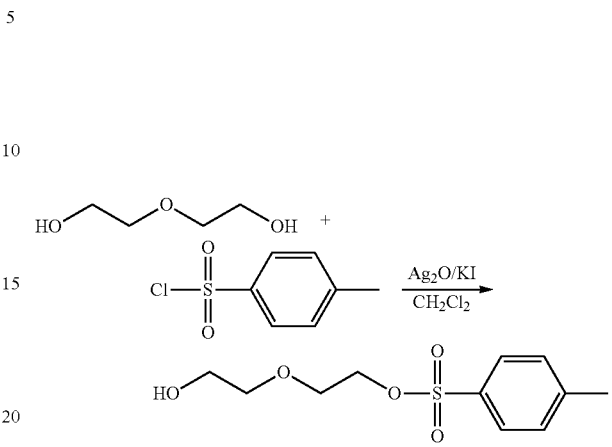

G1 Dendrimer Production

Typically, the first stage involves the synthesis of a G1 dendrimer which is typically synthesized by an esterification reaction between the alcohol (second monomer or branch extender monomer) of a mono-protected diol with any tricarboxylic acid (first monomer) of interest. For example, tricarboxylic acids can be used such as citric acid or aconitic acid can be used as the core or initiating monomer. In this example, aconitic acid, which has three acid groups available for esterification reaction, has been used as the core or initiating monomer. Esterification of the carboxylic groups occurs in the presence of N,N-dimethylamino pyridinium-p-toluene sulfonate (DPTS—a catalyst) and N-(3-Dimethylaminopropyl)-N'-ethylcarbodiimide (EDC—a catalyst) in acetonitrile or DMF (Moore & Stupp). Other suitable solvents are dichloromethane, chloroform or tetrahydrofuran. The reaction is preferably carried out at room temperature although temperatures in the range 0° C.-40° C. are suitable. The reaction can be allowed to proceed for a maximum of about 12 hours, however, a reaction time of about 8 to 12 hours is preferred. The esterification reaction results in a basic first generation dendrimer unit (G1) having three protected surface hydroxyl groups.

Protected G1

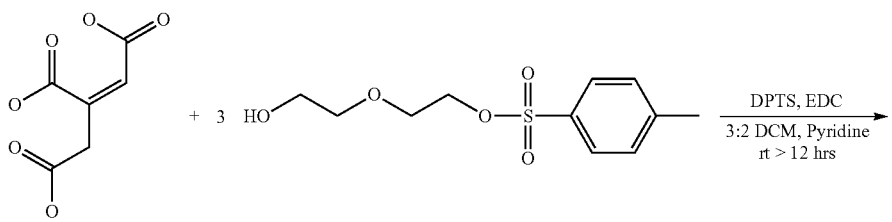

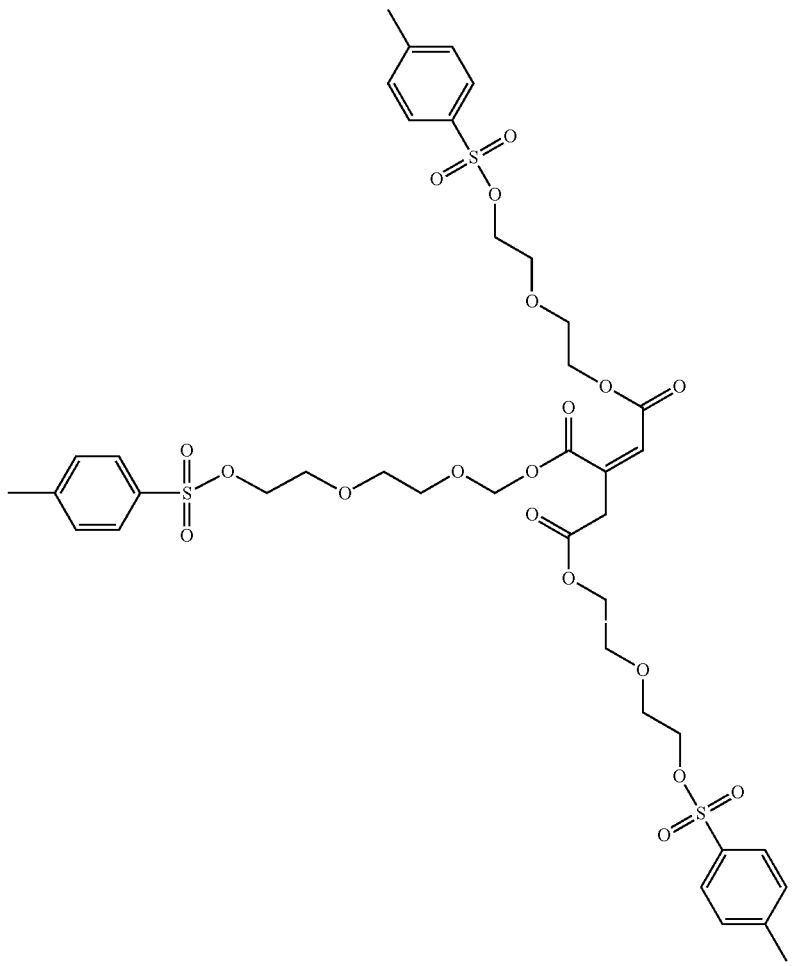

G2 Dendrimer Production

The protected surface functional groups of the G1 dendrimer are de-protected using acid or more preferably a source of fluoride ion such as tetrabutylammonium fluoride or tetrabutylammonium hydroxide for about 12 hours, preferably at room temperature, although any temperature in the range of about 20° C.-30° C. is suitable. The resulting unprotected hydroxyl surface functional groups of G1 are then reacted with excess of carboxylic acid (aconitic acid in this example) using the same esterification conditions as described in the G1 section to provided a half generation G1.5 dendrimer with aconitic acid bound to the surface hydroxyls by an ester bond. Monoprotected diol can be reacted with the dendrimer and de-protected to provide a G2 dendrimer having six surface hydroxyl groups available for further esterification reactions with mono-protected diols.

19	20
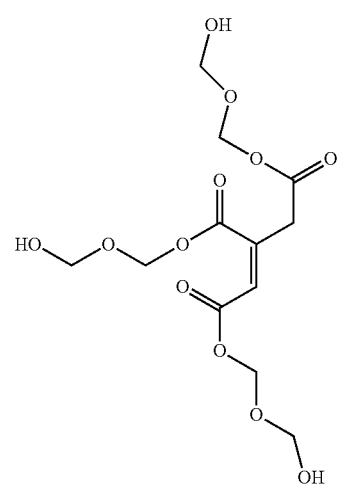
Aconitic Acid
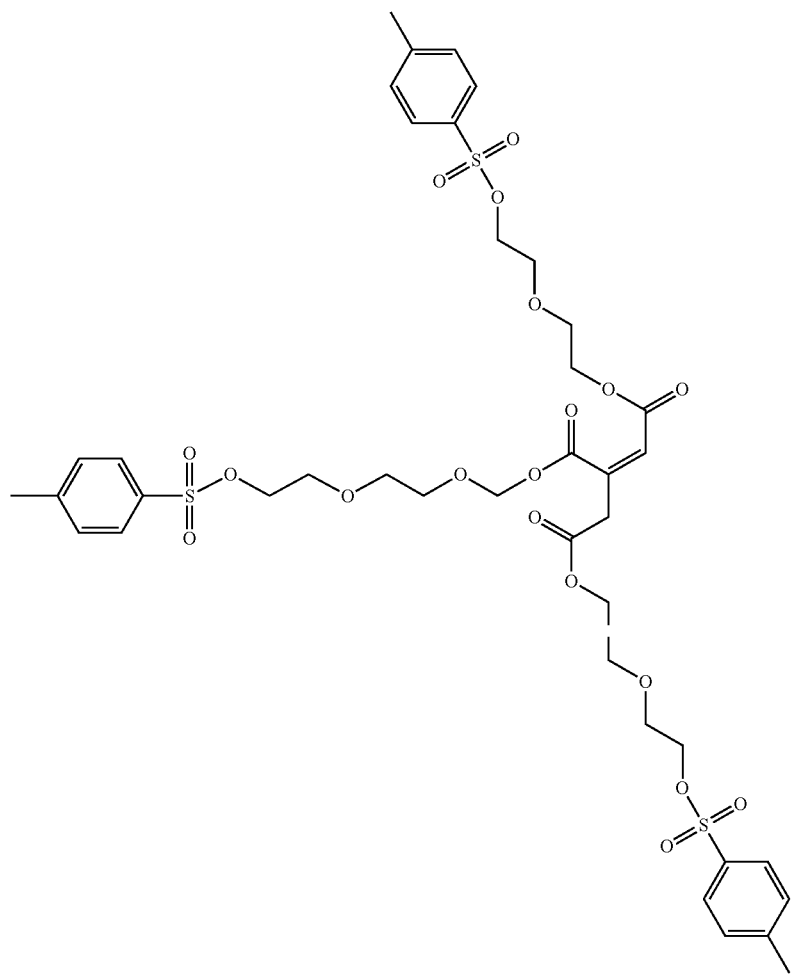
Bu•NH•OH
rt, 12 hrs
G1
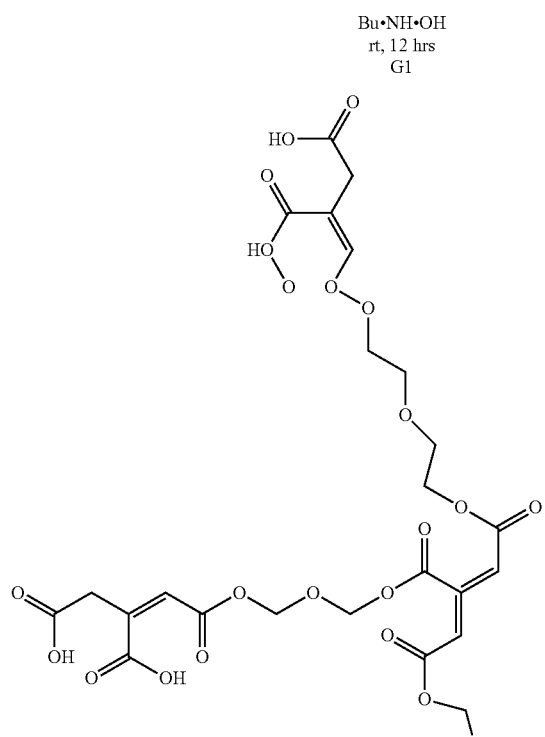

-continued
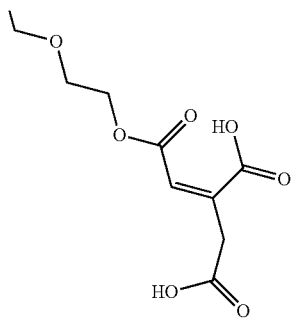
G1.5
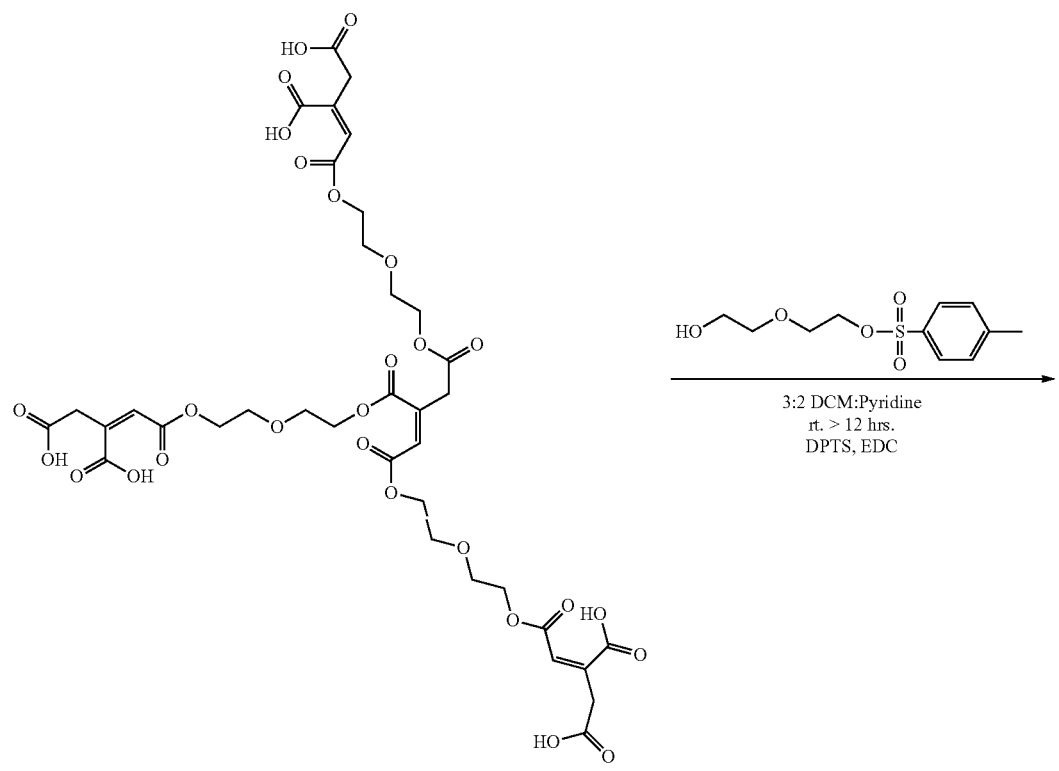
G1.5

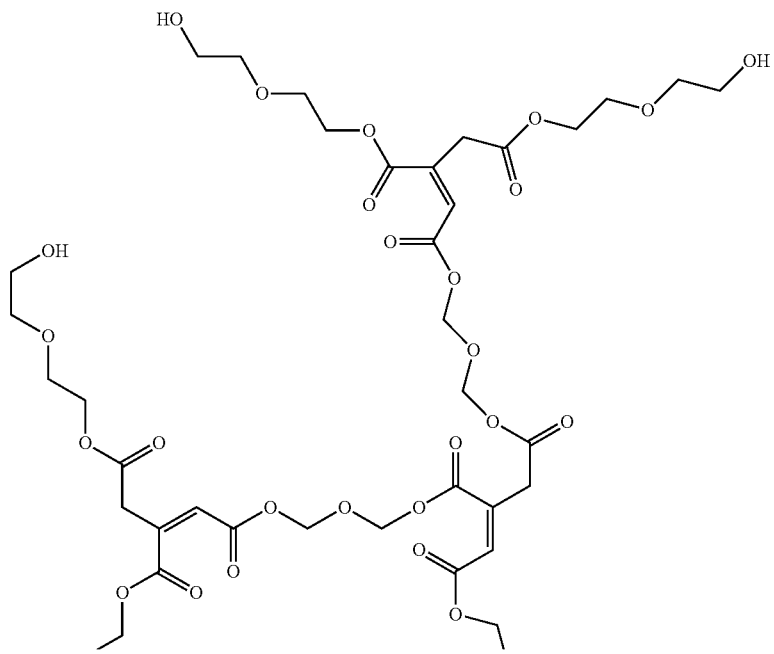
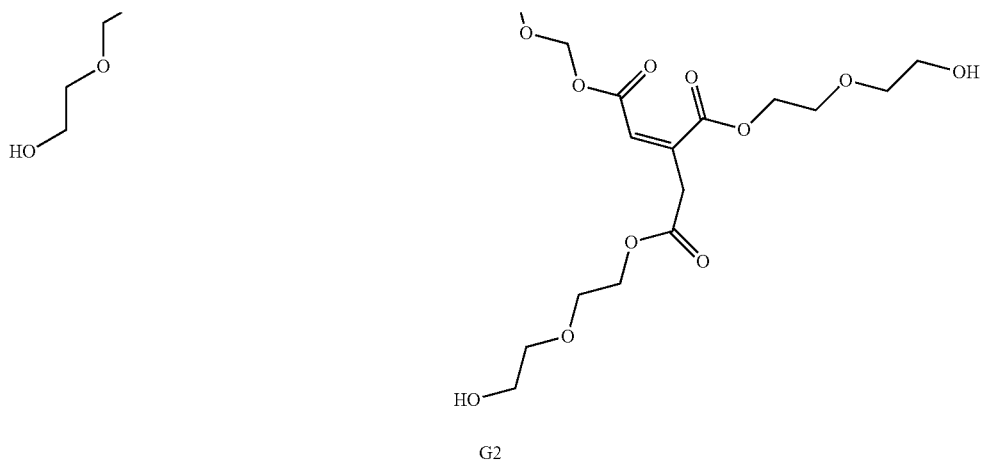

G2

G2 and G3 and Subsequent Generation Dendrimer Production

The dendrimer G2, containing the six hydroxyl surface functional groups can be then reacted with aconitic acid to produce a half generation G2.5 dendrimer. G2.5 dendrimer can then be reacted with the mono-protected diol of interest and then deprotected to provide a G3 dendrimer. The third generation G3 has twelve hydroxyl surface functional groups.

25 26
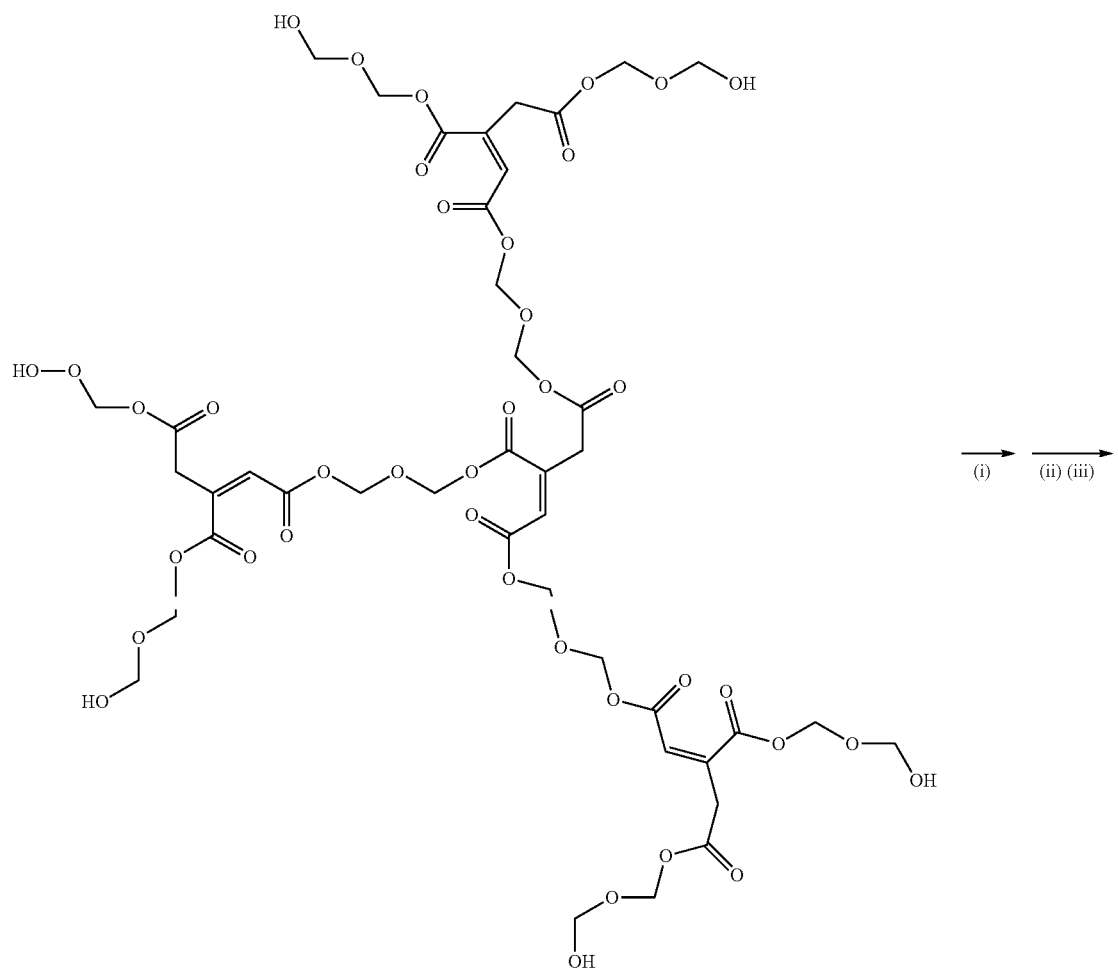
G2
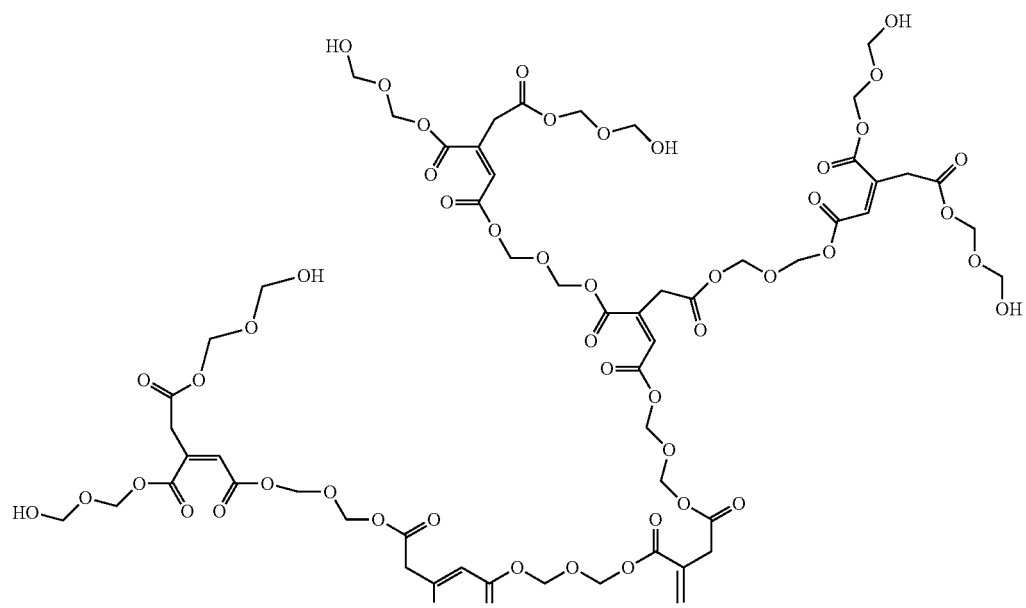

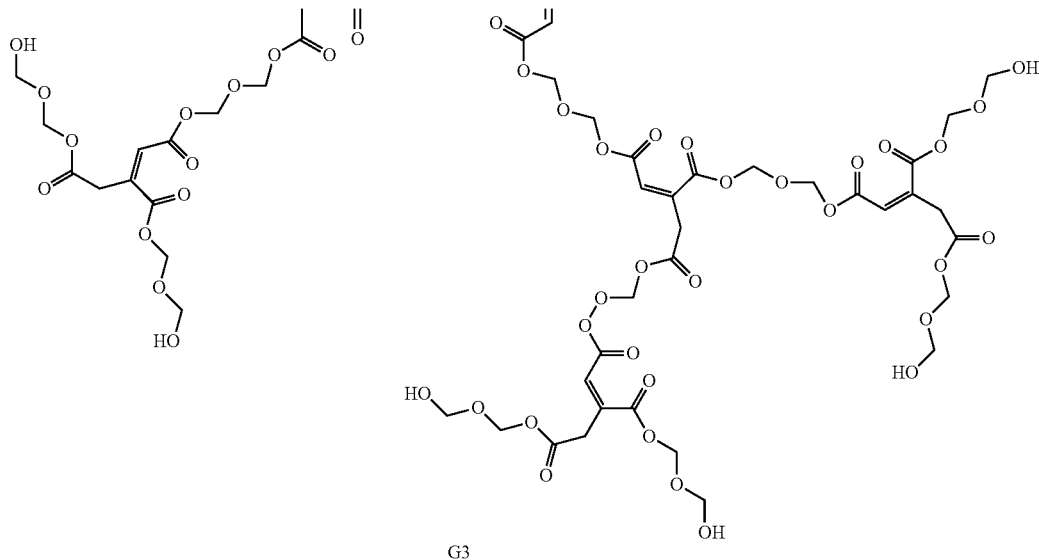

G3

(i) Aconitic acid, DPTS, DCC, Acetonitrile; (ii) mono-protected diol, DPTS, DCC; DMF (iii) Tetrabutyl ammonium hydroxide, THF Unprotected G3 dendrimers based on tricarboxylic acids and diols thus potentially may have 12 hydroxyl groups available for further esterification reactions with aconitic acid and subsequent steps, if higher generations (G4-G10 etc) are required. Successive generations can be produced by building up the dendrimer layers in succession, one after another (aconitic acid followed by diol) according to the reactions conditions provided herein.

Preparation of Activatable Carboxylic Acid Functional Dendrimer (CFD)

The unprotected $G_N$ dendrimer may then treated with excess of sodium succinic anhydride in anhydrous THF or DMF for about 8-12 hours at room temperature to provide an activatable carboxylic acid surface functionalised dendrimer.

The scheme below shows the fuctionalisation of a G3 dendrimer using a dicarboxylic acid group providing species.

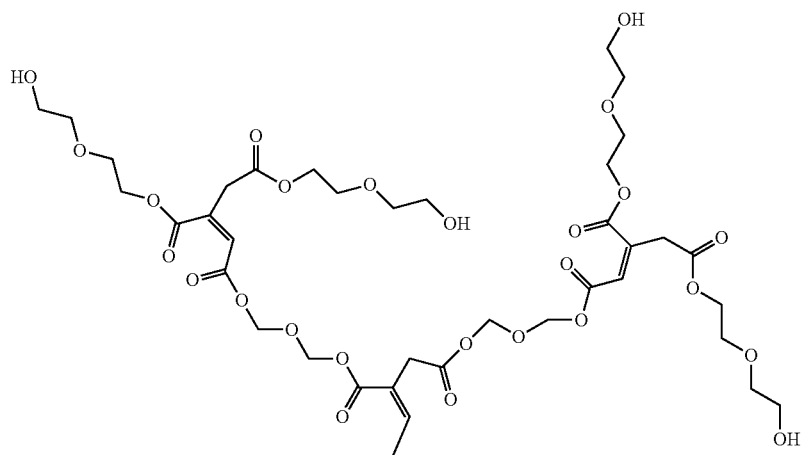

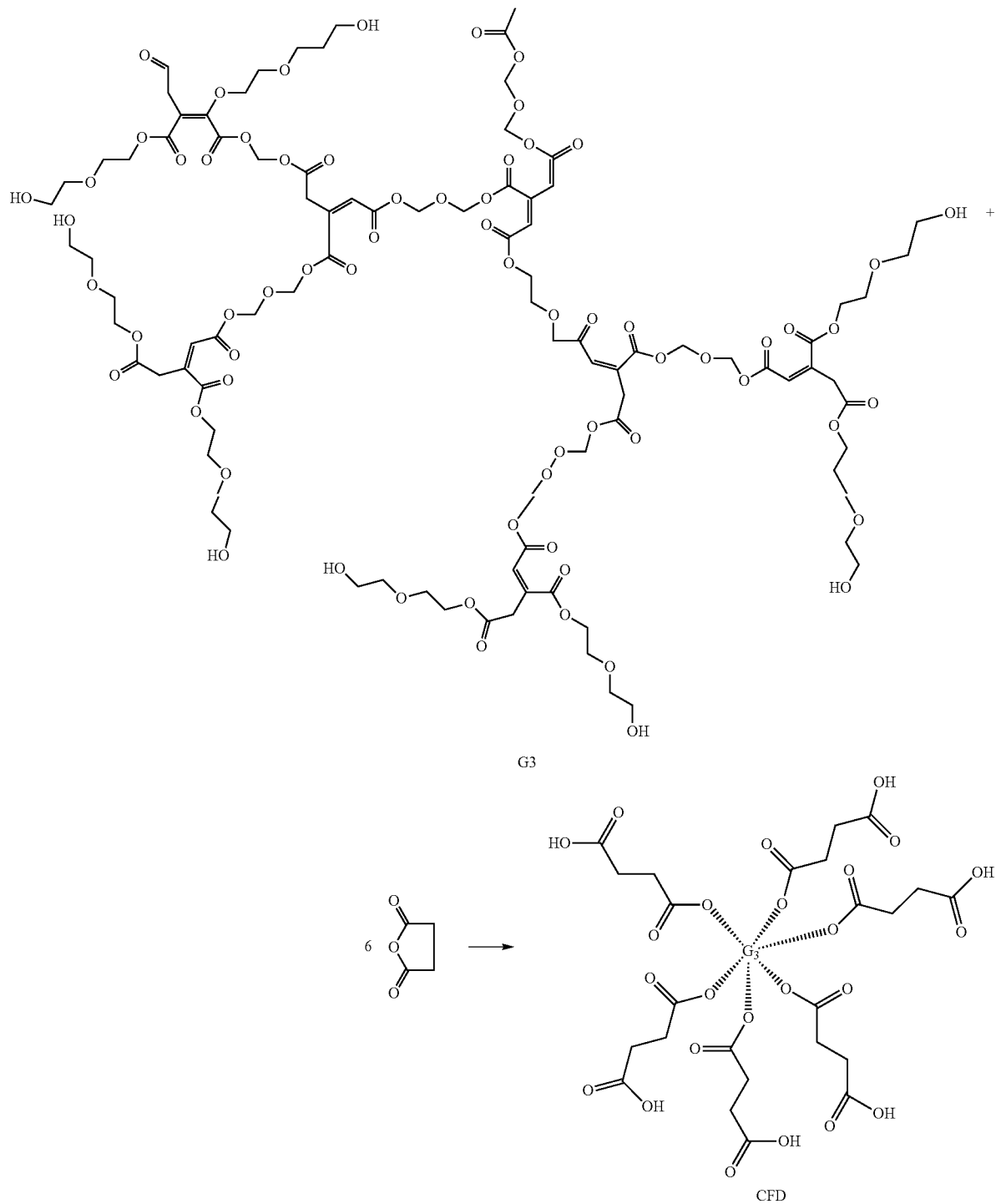

Preparation of Activated Carboxylic Acid Functionalised Dendrimer (ACFD)

The surface carboxylic acid functionalised groups of the dendrimer can be activated by treating with reagents such as pentafluorophenyl trifluoroacetate or pentafluorophenyl trifluoroacetate in anhydrous THF or DMF in presence of a base. This gives the activated pentafluorophenyl ester of the dendrimer. Activation results in formation of a hyperactive intermediate loosely bound ester with enhanced reactivity over regular carboxylic acid groups, and thus is capable of reacting easily with amine groups on the natural polymer rapidly to formamide groups, without the need for use of undesirable reagents such as EDC.

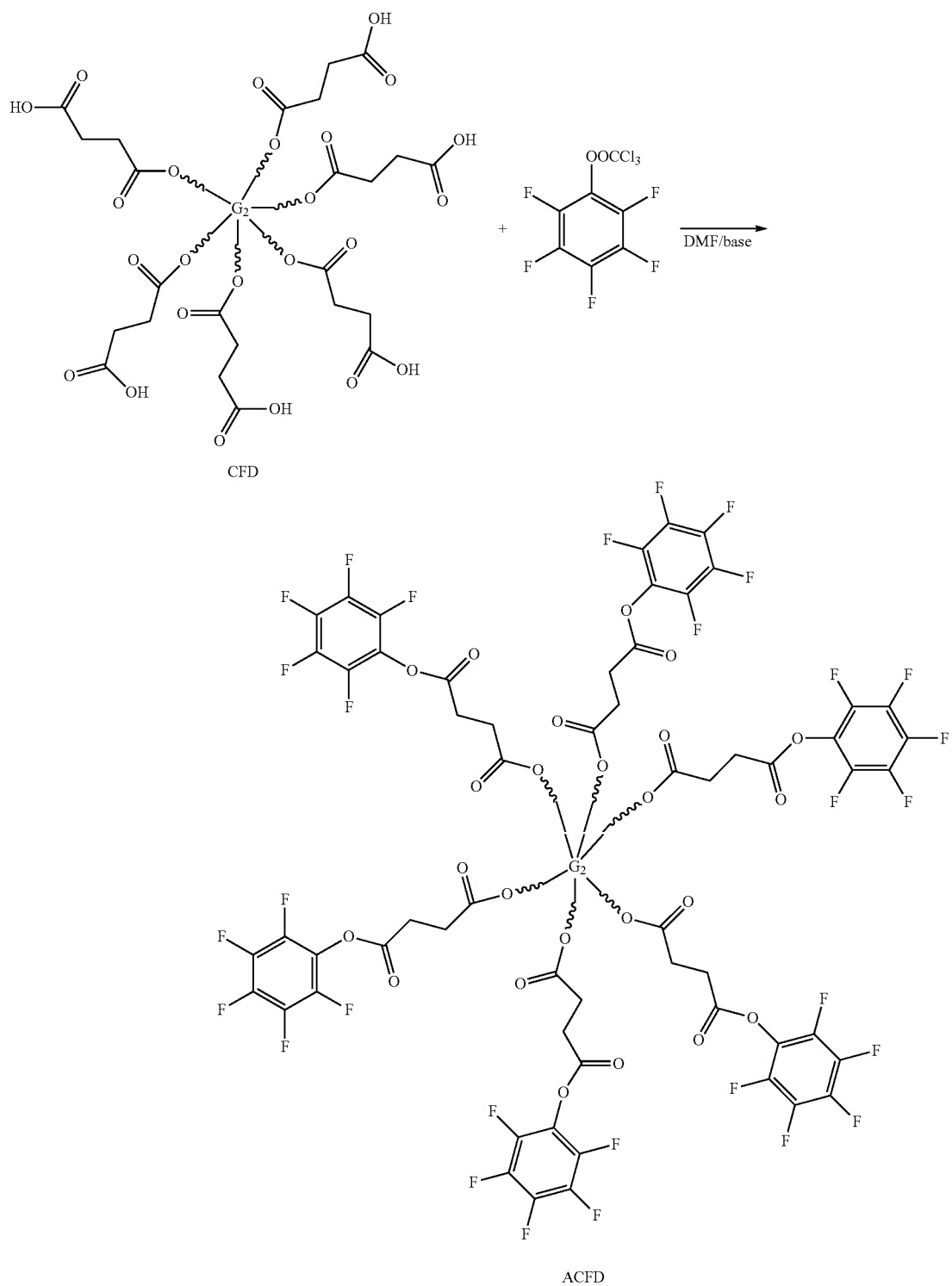

Activation of both the carboxylic acid groups produced from a dicarboxylic acid functional provider, such as succinic acid, or those resulting from the terminating aconitic acid species is possible. However, the carboxylic acid groups of dendrimer terminated with aconitic acid are positioned quite closely together and the close proximity of the acid groups means that carboxylic acid activation is hindered due to steric crowding. Thus activation of dendrimers terminated with aconitic acid carboxylic groups and subsequent reaction with amines will lead to different products.

Synthesis of PEG Dendrimer Method 2:

Aconitic acid (1.7411 g=0.01 moles) is refluxed with excess of tetraethylene glycol (or any polyol) in presence of anhydrous metal chlorides (viz. magnesium chloride, manganese chloride, zinc chloride, calcium chloride) and anhydrous aluminium oxide or heated silica to get generation 1 dendrimer. The generation G1 dendrimer with hydroxyl functional groups is further refluxed with excess of aconitic acid in presence of anhydrous metal chlorides (viz. magnesium chloride, manganese chloride, zinc chloride, calcium chloride) and anhydrous aluminium oxide or heated silica to produce generation G2 dendrimer. In this manner, different generation dendrimer can be prepared. The surface functional groups are modified in the same way as mentioned in the previous method.

Synthesis of PEG Dendrimer Method 3:

Aconitic acid is activated by using activating agents such as pentafluorophenol (PFP), N-hydroxy succinimide, benzotriazol-1-yl-oxy-tris(dimethylamino)phosphoniumhexafluorophosphate (BOP); benzotriazol-1-yl-N-oxy-tris(pyrrolidino)-phosphonium hexafluorophosphate (PyBOP); bromo-tris(pyrrolidino)-phosphonium hexafluorophosphate (PyBroP); N-[(dimethylamino)-1H-1,2,3-triazolo-[4,5-b]pyridin-1-yl-methylene]-N-methylmethanaminium hexafluorophosphate N-oxide (HATU); N-[(1H-benzotriazol-1-yl)(dimethylamino)methylene]-N-methylmethanaminium hexafluorophosphate N-oxide (HBTU); 2-(1Hbenzotriazole-1-yl)-1,1,3,3-tetramethyluronium tetrafluoroborate (TBTU). The activated aconitic acid is then treated with excess of polyol in presence of a base to get generation G1 dendrimer.

The generation G1 dendrimer with hydroxyl functional groups is further treated with excess of activated aconitic acid in presence of a base. This process gives the generation G2 dendrimer. This way different generation dendrimer is prepared. The surface functional groups are modified in the same way as mentioned in the previous method.

Preparation and Activation of Amine Functionalised Dendrimer (AFD)

The hydroxyl surface functional groups of the dendrimer can be converted into amine functional groups by reaction of the dendrimer with N-Fmoc-glycine pentafluorophenyl ester. Glycine amino acid is treated with Fmoc-OSu to protect the amine group. N-protected glycine carboxylic group is then pre-activated by treatment with pentafluorophenol. This activated N-protected glycine is treated with the dendrimer to get a dendrimer with N-protected amine surface functional groups. The N-Fmoc protection is then deprotected to get activated amine terminated dendrimer. Preparation steps for a G3 amine functionalised dendrimer are shown below.

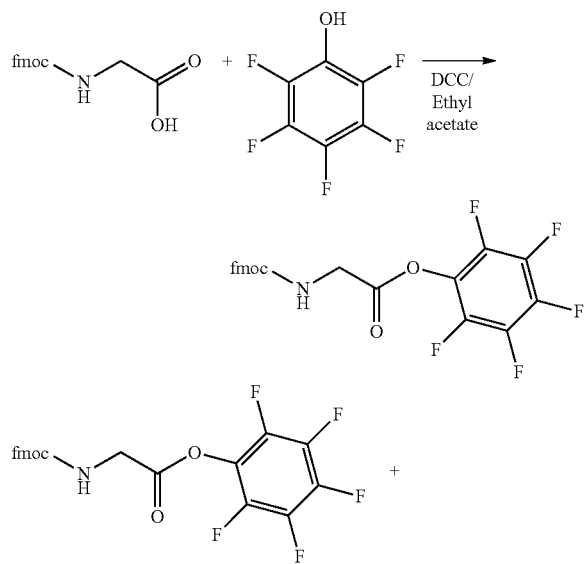

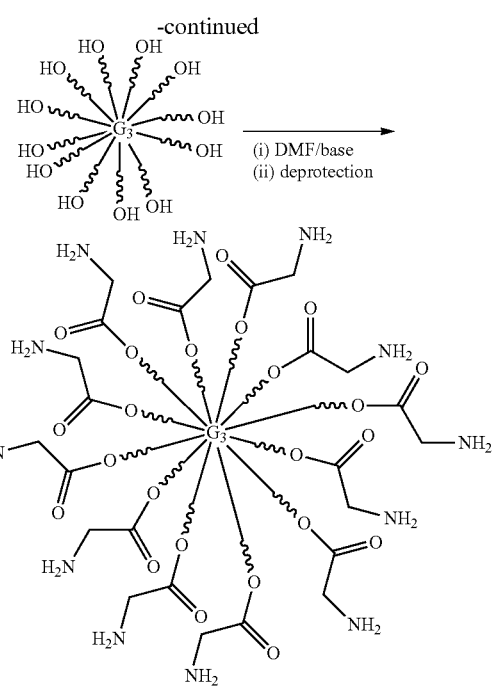

Cross Linked Natural Polymer with Dendrimer

The novel activated functionalised dendrimers can be utilised to cross-link natural polymers without the use of EDC pre-treatment of the natural polymer. This is advantageous because it avoids unwanted cross-linking in the polymer. Crosslinking is controllable due to the number of activated carboxylic acid groups on the dendrimer.

The natural polymer can be for example, collagen, chitosan, chitin, hyaluronan or any other polymer that comprises protein amino acid sequences, such as elastin. However, collagen has been used herein as an exemplary protein polymer. The dendrimer used is activated carboxylic acid functionalised dendrimer (ACFD).

The solution of natural polymer (3.0 mg/ml of collagen) is treated with a solution of 2 mg/ml of activated functional dendrimer in a polar solvent such as DMF, water or 1,4-dioxan for 12-24 hours at 4-5° C. The functional groups that take part in the cross-linking are pre-activated COOH groups of the dendrimer. The active COOH groups of the dendrimer react in the presence of $NH_2$ groups of the natural polymer without requirement of EDC or other activating agent. The activated carboxylic acid groups on the dendrimer surface provide a linking capacity to other functional groups. Depending on the number of functional groups that are needed to be attached, the dendrimer can be programmed accordingly. This allows the user to control the amount and number of crosslinks introduced into the polymer. As mentioned earlier, it will be appreciated that as the dendrimer surface functional groups are pre-activated, there is no need to use carbodiimide chemistry or other adjuvants to stimulate cross-linking.

It will be further appreciated that in this example the novel dendrimers are utilised to cross-link natural polymers for their application as molecular scaffolds, however the pre-activated functionalised dendrimer can be used equally well in other dendrimer applications.

In one embodiment, a functionalised third Generation (G3) dendrimer is synthesized and used as a cross-linker to produce a molecular scaffold from natural polymer. However, it will be appreciated that the invention is not limited to the use of a G3 dendrimer. It is preferable that dendrimers of G1-G10 level can be used as polymer cross linkers, depending on the requirements for any application. In some applications, G1-G10 dendrimers are preferred, in other applications, more particularly preferred however are G2-G8 dendrimers and other applications still, most preferred are G3-G5 dendrimers.

In one embodiment, it is advantageous to use low generation dendrimers, since low generation level dendrimers have more biologically favourable properties, when compared to high generations. For example, low generation level dendrimers are less toxic, less bulky and may fit more efficiently and thus are better able to cross link the natural polymer to form a scaffold.

The nature of incorporation of the dendrimers can be evaluated using shrink temperature and ATR-FTIR. The cytocompatibility of the dendrimer can also be tested. Characterisation of cross-linking may be determined by measurement of water uptake, determination of free amines, enzymatic degradation assays, uniaxial testing of bulk material, FTIP, dynamic mechanical analysis and differential scanning calorimetry.

Materials and Methods.
Materials

Acontic acid, poly(ethylene glycol) (MW 200), diethylene glycol, absolute ethanol, methanol, p-toluene sulfonyl chloride (pTSCl), p-toluene sulfonic acid (PTSA), 4-(Dimethylamino)pyridinium 4-toluene sulfonate (DPTS), 4-(Dimethylamino)pyridine (DMAP), silver oxide, potassium iodide (KI), succinic anhydride, collagen.

Preparation of DPTS

PTSA (19.022 g) is dehydrated by refluxing with toluene in a Dean Stark apparatus for 3 hours. A solution of DMAP (12.217 g) in toluene is prepared. The two solutions are mixed and the white suspension is cooled and filtered. The solid is re-crystallized using dry dichloroethane to give white needles which melt at 165° C.

Preparation of Silver Oxide

A solution of silver nitrate (30 g) in zoo ml water and a solution of sodium hydroxide (6.9 g) in 200 ml of water are heated to 80-90° C. for 30 min separately. These two solutions are mixed together and the suspension is hot filtered. The solid is washed with 200 ml of hot water and 200 ml of 95% ethanol and finally with 200 ml of ethanol to yield silver oxide.

Monoprotection of Ethyleneglycol

One of the functional OH of the diols (i.e ethylene glycols) is protected selectively before reacting with the aconitic acid. The diol is mono-protected using silver oxide and alkyl halide in quantitative yields.

Preparation of Mono-Protected Diol

The diols before reacting with the dendrimer core (aconitic acid) are to the monoprotected. The diols are protected by treatment with (1.0 equivalent) freshly prepared silver oxide (1.5 equivalent) and p-toluene sulfonyl chloride (pTSCl) (1.1 equivalent) in the presence of potassium iodide (KI) (0.2 equivalent) in dichloromethane. The resulting mixture is stirred for 8-10 hours to yield mono-tosyl protected diol in 97-99% yield.

Preparation of Dendrimer G1

The generation dendrimer (G1) is prepared by reacting mon-protected diol with aconitic acid by the procedure reported by Moore and Stupp for esterification of aliphatic acids. The mono-protected diol (4 equivalent) (in excess) is treated with aconitic acid (1 equivalent) in the presence of DPTS (1.1 equivalent) and EDC (1.2 equivalent) in dichloromethane or DMF. The resulting mixture is stirred for 8-10 hours at room temp to give Dendrimer 1 with protected OH surface groups.

Preparation of Dendrimer G2

The protected surface functional groups of the dendrimer G1 are deprotected using tetrabutyl ammonium fluoride or hydroxide for 12 hours at room temp. The resulting unprotected OH surface groups are then reacted with excess of aconitic acid using the same procedure as above, using DPTS and EDC to yield Dendrimer G2.

Preparation of Dendrimer G3

The dendrimer G2 containing the surface COOH surface functional groups are then reacted with mono-protected diol to get protected surface functional Dendrimer D3. The protected group is then subsequently deprotected using the same procedure as above Preparation of COOH Functional Dendrimer The dendrimer D3 is treated with excess of succinic anhydride in anhydrous THF or DMF for 8-12 hours at room temp to get COOH functional dendrimer.

Preparation of Activated COOH Function Dendrimer

The COOH functionalised dendrimer may then activated by using PFP (pentafluorophenol). The dendrimer is treated with excess pentrafluorophenol in the presence of DPTS (1.2 equiv) and EDC (1.5 equiv) in dichloromethane or DMF for 12 hours to get PFP activated COOH functional dendrimer.

Cross Linking Natural Polymer with Dendrimer

The solution of natural dendrimer (3.0 mg/ml of collagen) is treated with a solution of 2 mg/ml of activated functional dendrimer in DMF for 12-24 hours at 4-5 C. The cross-linked scaffold is then freeze dried and washed with 50:50 triethylamine:water or dilute ammonium hydroxide at 4-5 C for 12 hours and then water for 12 hours, finally with neutral buffer.

Infrared Spectroscopy

IR spectra were recorded at room temperature (26+1 C) in the mid infrared range (4000-400 $cm^{-1}$) using attenuated total reflectance Fourier transform infrared spectrometer, (ATR-FTIR) (FTIR-8300, Shimadzu Europe Ltd., Duisburg, Germany). Typically, 50 scans were signal-averaged for a single spectrum at a resolution of 8 $cm^{-1}$ using ZnSe crystal at an incident angle of 45 C. The spectra were analysed using the Hyper-IR software (Shimadzu Europe Ltd., Duisburg, Germany) to obtain quantitative peak information. The infra-red spectrum of a G3-OH dendrimer is shown in FIG. 1.

Non-crosslinked polymers are exposed to different crosslinking conditions of dendrimer. GA is used as a positive control. Different ratios of substrate to dendrimer will affect the amount on cross-linking in the systems.

Characterisation of cross-linking may be determined by measurement of water uptake, determination of free amines, enzymatic degradation assays, uniaxial testing of bulk material, FTIP, dynamic mechanical analysis and differential scanning calorimetry. RGD and GFP are added to the aqueous solutions of the different generations of PEG dendrimer systems. THE RGD/GFP modified dendrimer product will be purified by dialysis against the water for 2 days.

The purified product may be freeze-dried for characterisation or further reaction. The purified RGD/GFP modified dendrimer can be reconstituted in deuterated water for H-NMR analysis. Spectra for the dendrimer will be recorded and the peaks compared.

Once cross-linked, the substances may be removed from the moulds and immersed in glycine solution (0.5% PBS) at room temp to react with any residual activated carboxylic acid groups and to extract out the reaction product.

In order to directly quantify the RGD and GFP content in the modified substrates will be radiolabelled with 125 l using Iodogen method and will be counted in a gamma counter to determine the amount of RGD or GFP present in the substrate.

The words "comprises/comprising" and the words "having/including" when used herein with reference to the present invention are used to specify the presence of stated features, integers, steps or components but does not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention that are, for brevity, described in the context of a single embodiment, may also be provided separately or in any suitable sub-combination. The invention is not limited to the embodiments hereinbefore described but may be varied in both construction and detail.

REFERENCES

1. Merdan, T., Callahan, J., Peterson, H., Kunath, K., Bakowsky, U., Kopeckova, P., Kissel, T. and Kopecek, J. (2003). Pegylated Polyethyleimine-Fab_Antibody Fragment Conjugates for Targeted Gene Delivery to Human Ovarian Cancer Cells, *Bioconjugate Chem.*, 13: 845-854.
2. Zinselmeyer, B. H., Mackay, S. P., Schatzlein, A. G. and Uchegbu, I. J. (2002). The Lower-Generation Polypropyleimine Dendrimers are Effective Gene-Transfer Agents, *Pharm. Res.*, 19(7): 960-967.
3. Kojima, C., Kono, K., Maruyanma, K. and Takagishi, T. (2000). Synthesis of Polyamidoamine Dendrimers Having Poly(ethyleneglycol) Grafts and their Ability to Encapsulate Anticancer Drugs, *Bioconjugate Chem.*, 11: 910-917.
4. Duncan, R. (1992). Drug-Polymer Conjugates: Potential for Improved Chemotherapy, *Anti-Cancer Drugs*, 3:175-210.
5. Kono, K., Liu, M. and Frechet, J. M. J. (1999). Design of Dendritic Macromolecules Containing Folate or Methotrexate Residues, *Bioconjugate Chem.*, 10:1115-1121.
6. Tomalia, D. A. and Durst, H. D. (1993). Genealogically Directed Synthesis: Starburst/Cascade Dendrimers and Hyperbranched Structures, *In Techniques in Current Chemistry*, 165: Weber, E. (ed.), Springer-Verlag, Berlin.
7. Malik, N., Wiwattanapatapee, R., Klopsch, R., Lorenz, K., Frey, H., Weener, J. W., Meijer, E. W., Paulus, W. and Duncan R. (2000). Relationship Between Structure and Biocompatibility In Vitro and Preliminary Studies on the Biodistribution of 125l-Labelled Polyamidoamine Dendrimers In Vivo, *J. Controlled Release*, 65:133-148.
8. Merdan, T., Kopecek, J. and Kissel, T. (2002). Prospects for Cationic Polymers in Gene and Oligonucleotide Therapy Against Cancer, *Advanced Drug Delivery Reviews*, 54: 715-758.
9. Luo, D., Haverstick, K., Belcheva, N., Han, E. and Saltzman, W. M. (2002). Poly(ethylene glycol)-Conjugated PAMAM Dendrimer for Biocompatible, High-Efficiency DNA Delivery, *Macromolecules*, 35: 3456-3462.
10. Kunath, K., von Harpe, A., Petersen, H., Fischer, D., Voigt, K., Kissel, T. and Bickel, U. (2002). The Strucuture of PEG-Modified Poly(Ethylene Imines) Influences Biodistribution and Pharmacokinetics of their Complexes with NF-kB Decoy in Mice, *Pharm. Res.*, 19(6): 810-817.
11. Petersen, H., Fechner, P. M., Martin, A. L., Kunath, K., Stolnik, S., Roberts, C. J., Fischer, D., Davies, M. C. and Kissel, T. (2002). Polyethyleneimine-graft-Poly(ethylene glycol) Copolymers: Influence of Copolymer Block Structure on DNA Complexation and Biological Activities as Gene Delivery System, *Bioconjugate Chem.*, 13: 845-854.
12. Gillies, E. R., Dy E., Fre'chet J. M. J., and Szoka F. C. (2005). Biological Evaluation of Polyester Dendrimer Poly(ethylene oxide) "Bow-Tie" Hybrids with Tunable Molecular Weight and Architecture. *Mol. Pharmaceutics*, 2:129-138.
13. Namazi, H. and Adeli, M. (2005). Dendrimers of citric acid and poly (ethylene glycol) as the new drug-delivery agents. *Biomaterials*, 26 (10): 1175-1183.
14. Hedden, R. C., and Bauer, B. J. (2003). Structure and Dimensions of PAMAM/PEG Dendrimer-Star Polymers. *Macromolecules*, 36:(6): 1829-1835.

The invention claimed is:

1. An activatable functionalised $N^{th}$ generation dendrimer having:
    a core comprising a first monomer having at least two carboxylic acid functional groups; and
    N successive generations, where N=1 to 10, wherein each generation comprises:
        a second monomer having at least two alcohol functional groups which is a polyether or a polyglycol, selected from the group: diethylene glycol, triethylene glycol, tetraethylene glycol or ethylene glycol; wherein at least one alcohol group of the second monomer is bonded to a carboxylic acid group of the first monomer of the prior generation, and
        an additional first monomer attached to a second alcohol function group of said second monomer of that generation; and
    the final generation having attached thereto at said second alcohol functional group of said second monomer, a moiety having a dicarboxylic acid functional group, activatable by treatment with a carboxylic acid activating reagent such that reactivity of the carboxylic acid functional group is increased.

2. A dendrimer according to claim 1 wherein the moiety having a dicarboxylate functional group is derived from an acid anhydride.

3. A dendrimer according to claim 2 wherein the acid anhydride is succinic acid anhydride, maleic acid anhydride, glutaric acid anhydride, adipic acid anhydride, pimelic acid anhydride, suberic acid anhydride, azelaic acid anhydride or sebacic acid anhydride.

4. A dendrimer according to any of claims 1 to 3 wherein said carboxylic acid activating reagent is selected from the group comprising pentafluorophenol (PFP), N-hydroxy succinimide (NHS), benzotriazol-1-yl-oxy-tris(dimethylamino) phosphoniuhme xafluorophosphate (BOP), benzotriazol-1-yl-N-oxy-tris(pyrrolidino)-phosphonium hexafluorophosphate (PyBOP), bromo-tris(pyrrolidino)-phosphonium hexafluorophosphate (PyBroP), N-[(dimethylamino)-1H-1,2,3-triazolo-[4,5-b]pyridin-1-yl-methylene]-N-methylmethanaminium hexafluorophosphate N-oxide (HATU), N-[(1H-benzotriazol-1-yl)(dimethylamino)methylene]-N-methylmethanaminium hexafluorophosphate N-oxide (HBTU) and 2-(1Hbenzotriazole-1-yl)-1,1,3,3-tetramethyluronium tetrafluoroborate (TBTU).

5. A dendrimer according to claim 1, wherein said first monomer having at least two carboxylic acid functional groups is a 1,3,5-tricarboxylic acid.

6. A dendrimer according to claim 5, wherein said 1,3,5-tricarboxylic acid is aconitic acid.

7. A dendrimer having a structure formula G1.

8. A dendrimer having a structure formula G2.

9. A dendrimer having a structure formula G3.

10. A cross-linked natural polymer comprising a dendrimer as claimed in any one of claims 1 and 7 to 9.

11. A nanoshell comprising the cross-linked natural polymer of claim 10.

\* \* \* \* \*